Sept. 29, 1953  J. J. GABORC  2,654,075
TEST PROBE
Filed Jan. 10, 1950

INVENTOR
JAMES J. GABORC
BY
ATTORNEY

Patented Sept. 29, 1953

2,654,075

UNITED STATES PATENT OFFICE 2,654,075

TEST PROBE

James J. Gaborc, New York, N. Y.

Application January 10, 1950, Serial No. 137,791

9 Claims. (Cl. 339—108)

This invention relates to temporary electrical connection devices and is particularly directed to a test probe device for use in making circuit tests of radio, television and electronic apparatus.

It is common knowledge in the art of radio and electronic apparatus construction that electrical components and conductors are often closely grouped so that it is difficult to make and maintain a temporary test connection with the ordinary solid-tip type of test probe. Moreover, when using such a solid-tip type of test probe, the danger is present that the probe will slip off the part contacted to and make contact with another part or conductor carrying a current that will damage the test instrument to which the probe connects on the equipment.

Another disadvantage of the ordinary type test probe is that its insulated conductor wire is brought out through the end of the insulated handle, thereby being subject to unnecessary bending and handling by the operator when using the test probe, with the result that the wire soon becomes frayed and a likely source of shock to the operator.

It is accordingly an object of this invention to provide a test probe for temporary electrical connections that has a tip no larger than the standard solid tip-jack on the ordinary test probe and at the same time has means in the tip to firmly grip the conductor or part to be connected to for test.

It is another object of this invention to provide a test probe of the character described that will maintain an electrical connection without the necessity of holding it in place. Two or more test instruments may be connected for simultaneous test leaving both hands free and also to enable the operator to observe test instruments carefully to take accurate readings.

It is a further object of this invention to provide a test probe of the character described in which the lead wire from the probe to the test instrument passes through the side of the probe handle at its lower end, so that it is not unduly handled by the operator in the manipulation of the probe.

It is a further object of this invention to provide a test probe of the character described that, because of its gripping feature and because of the placement of the lead wire away from the test probe handle, is particularly safe and suitable for connecting into high voltage circuits.

It is a further object of this invention to provide a test probe of the character described that is adaptable for use in holding small parts, such as screws, nuts, pins, etc., to be located in places inaccessible to other tools.

Other objects of this invention will in part be obvious and in part hereinafter pointed out.

The invention accordingly consists in the features of construction, combination of elements and arrangement of parts, which will be exemplified in the construction hereinafter described, and of which the scope of application will be indicated in the appended claims.

In the accompanying drawing, in which are shown three of the various possible embodiments of this invention, Fig. 1 is a side view of a test probe embodying the invention;

Figure 1:
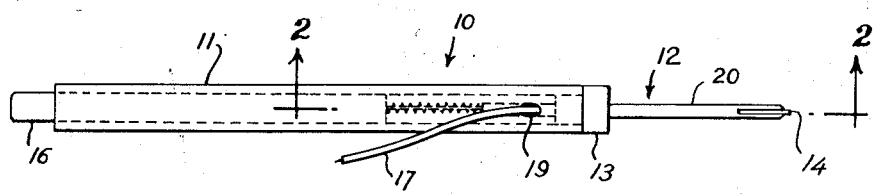

Referring now in detail to the drawings, 10 designates a test probe in accordance with this invention, comprising a tubular handle 11, a tip member 12, a retaining part 13, a hook actuating member 16 and a flexible connector lead wire 17.

Tubular handle 11 is non-conducting and preferably constructed of "Bakelite" or a plastic material having good dielectric properties. One end of the handle is internally threaded, as at 18, to receive therein the tip member 12, hereinbelow described. Said handle has, near its threaded end, an obliquely drilled opening 19 to receive lead wire 17.

Figure 3:
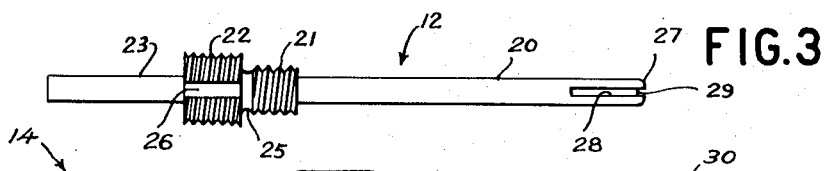
Fig. 3 is a detail view of the tip member of the test probe.
Figures 4, 5:
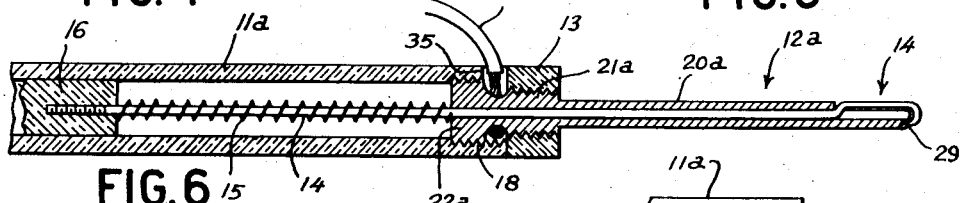
Fig. 4 is a side view of the hook member.
Fig. 5 is a top view of the hook member.

Tip member 12 is integrally formed, preferably of hard brass, and comprises a cylindrical probe portion 20, a first externally threaded portion 21 of larger diameter, a second externally threaded portion 22 of still greater diameter, and extended portion 23 of a diameter approximately equal to the diameter of probe portion 20 (Fig. 3). The whole has an axial bore 24, in which hook member 14, hereinbelow detailed, is slidably disposed. Said tip member is under-cut at threaded portion 21 where it joins threaded portion 22, so as to form an annular groove 25, furnished to receive lead wire 17. Threaded portion 22 has a longitudinal slot 26 to receive said wire. The end of probe portion 20 is rounded as at 27 and has in its wall a longitudinal slot 28 in alignment with slot 26. Diametrically opposite said slot at tip 27 is a notch 29 shaped to receive therein the hook portion of hook member 14.

Said hook member is fabricated of hard brass or bronze and comprises a round rod portion 30, an off-set flattened portion 31 and a downwardly and inwardly extending hook portion 32.

Retaining part 13, preferably constructed of a dielectric material, is tubular, of the same outside diameter as handle 11, and is internally threaded as at 33 to screw on to threaded portion 21 of tip member 12.

Figure 2:
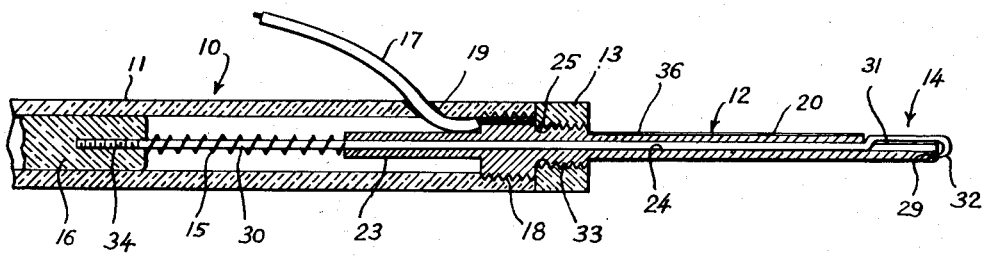
Fig. 2 is a sectional view taken on line 2—2 of Fig. 1.

Figs. 1 and 2 show an assembled test prod in accordance with the invention. Threaded portion 22 is screwed into internal threads 18 of the handle, probe portion 20 extending outwardly. Lead wire 17 enters through opening 19 and slot 26, in alignment therewith, to annular groove 25, where the bared conductor wire makes electrical contact with tip member 12 either by being soldered in the groove, or by being held firmly in place therein by the action of retaining part 13, screwed onto threaded portion 21 tightly against the probe end of the handle.

Hook member 14 is slidably located within the bore 24 of tip member 12, its flattened hook portion 31 being disposed in notch 29, so that the tip end appears to be more or less rounded and is of no greater size than the ordinary solid tip-jack type of test probe.

Rod portion 30, extending within the handle, is force-fitted or screwed, as at 34, into actuating member 16, slidably disposed in said handle. Said actuating member is fashioned of a dielectric material and normally extends from the top end of said handle about the same length as is the length of flattened hook portion 31.

Compression spring 15 is circumjacently disposed on rod portion 30 between actuating member 16 and extended portion 23 of tip member 12, so as to urge the hook member in its inward position under the compressional force imparted by said spring.

In this position, hook portion 32 is seated in notch 29.

The utility of the test probe may be enhanced by baking or drying on probe portion 20 a thin coating of insulating varnish 36, which may be of the type known as "Glyptol."

In use, the test probe hook is controlled by pressing on the extending end of hook actuating member 16 with the thumb. The hook jaw of the probe is then moved into contact with the conductor or part to be contacted and the actuating member released, whereupon a grasping contact is made and maintained. It has been found that the construction of the probe hook is such that it is effective in hooking on to various shapes and sizes of conductors and parts, even though the tip assembly is of substantially the same size as that of the ordinary solid-tip test probe.

Moreover, this test probe may also be used in making momentary test connections by contacting with the tip of the probe as is done with ordinary test probes.

Figures 6, 7:
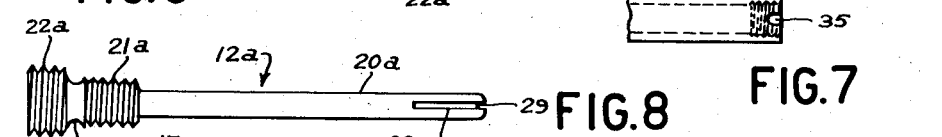
Fig. 6 is a sectional view of a modified embodiment of the invention, showing a different way in which the conductor lead may be connected.
Fig. 7 is a partial side view of the handle shown in Fig. 6.
Figures 8, 9:
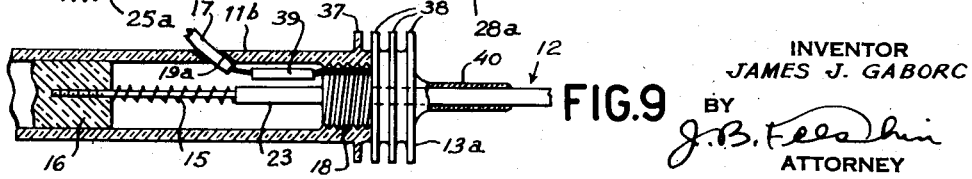
Fig. 8 is a detail view of the tip member in accordance with the modified test probe shown in Fig. 6.
Fig. 9 shows another modification of this invention adapting the test probe for use in connecting to high voltage circuits.

Figs. 6, 7 and 8 show a modification of the invention in which lead wire 17 connects through an opening 35 in the wall at the threaded end of handle 11a, so as to be in alignment with groove 25a of tip member 12a in the assembled unit (Fig. 6). This modification also differs from the first described embodiment in that extended portion 23 and slot 26 of the tip member shown in Fig. 3 are omitted (see Fig. 8), thereby allowing for a simpler construction.

Otherwise, portions 22, 22a and 21, 21a; grooves 25, 25a; probe portions 20, 20a and slots 28, 28a correspond respectively.

Fig. 9 shows another modified embodiment of the invention adapting it for use especially in connecting to high voltage circuits.

This modification differs from the embodiment described and shown in Figs. 1 and 2, in that it has its outer handle surface near the tip end contoured for minimum current leakage to the operator's hand. Thus, the probe end of handle 11b is formed with an annular projection, as at 37; and retaining part 13a is likewise formed with annular projections 38. For further protective insulation, retaining part 13a may be provided with a thin insulating sleeve 40, surrounding tip member 12 and extending nearly to the tip of the test probe.

This modification also provides for the inclusion of an isolating or current limiting series resistor 39 connected between lead wire 17 and groove 25 and so disposed between the inside wall of handle 11b and extended portion 23 as shown in Fig. 9.

Said resistor serves the purpose of dropping the potential to the lead wire 17 in case the operator accidentally makes contact with it, thereby limiting the current and protecting the operator against the possibility of dangerous electrical shock.

It will thus be seen that there is provided a device in which the several objects of this invention are achieved and which is well adapted to meet the conditions of practical use.

As various possible embodiments might be made of the above invention, and as various changes might be made of the embodiments set forth, it is to be understood that all matter herein set forth or shown in the accompanying drawing is to be interpreted as illustrative and not in a limiting sense.

Having thus described my invention, I claim as new and desire to secure by Letters Patent:

1. A test probe comprising a tubular handle member made of insulating material, a tubular probe member of electrical conductive material attached to the front end of the handle member and extending forwardly therefrom and being coaxial therewith, said probe member being formed with a longitudinal through slot at its forward end, a metallic rod having a straight portion slidable through the tubular probe member and contacting its inner surface, said rod being formed with an offset portion extending from the straight portion into said through slot, and a portion extending from the offset portion parallel to the straight portion and disposed within said through slot, a hook portion extending from the outer end of the last portion and traversing the opening in said tubular probe member, the outer end of said hook portion being aligned with a portion of said tubular probe member diametrically opposite to said slot.

2. The combination of claim 1, wherein the outer end of the tubular probe member is formed with a notch to receive the outer end of said hook portion.

3. The combination of claim 1, wherein the tubular probe member is of smaller diameter than the tubular handle member and is circular in cross section and wherein the internal diameter of the tubular handle member is greater than the external diameter of the tubular probe member.

4. The combination of claim 1 in combination with a push button at the rear end of the straight portion of the rod and normally projecting beyond the rear end of said tubular handle member, a coil compression spring surrounding said straight portion and interposed between the push button and the tubular probe member, the portion of the push button projecting rearwardly beyond the handle member being no greater in length than the length of said through slot in said probe member.

5. The combination of claim 4 in which the portion of the rod within said slot and the hook portion are flat and the straight rod portion is of round stock.

6. A test probe comprising a tubular handle made of insulating material, a tubular probe member attached to the front end of the handle and extending forwardly therefrom, said probe member being formed with a longitudinal through slot at its forward end, a rod member having a straight portion slidable through said tubular probe member, at least one of said members being made of electrical conductive material, said rod member being formed with an offset portion extending from the straight portion into said through slot, and a portion extending from the offset portion parallel to the straight portion and disposed within said through slot, a hook portion extending from the outer end of the last portion and traversing the opening in said tubular probe member, the outer end of said hook portion being aligned with a portion of said tubular probe member diametrically opposed to said slot.

7. A test probe comprising a tubular handle made of insulating material, a tubular probe member attached to the front end of the handle and extending forwardly therefrom, and being coaxial therewith, said probe member being formed with a through slot at its forward end, a rod member having a straight portion slidable through said tubular probe member, at least one of said members being made of electrical conductive material, said rod member being formed with an offset portion extending from the straight portion into said through slot, and a hook portion traversing the open end of said tubular probe member, the outer end of said hook portion being aligned with a portion of said tubular probe member diametrically opposite to said slot.

8. The combination of claim 7 wherein the outer end of the tubular probe member is formed with a notch to receive the outer end of said hook portion.

9. The combination of claim 8 wherein the tubular probe member is of smaller diameter than the tubular handle member and is circular in cross section.

JAMES J. GABORC.

References Cited in the file of this patent

UNITED STATES PATENTS

| Number | Name | Date |
| --- | --- | --- |
| 467,891 | Neu | Jan. 26, 1892 |
| 913,439 | Steinberger | Feb. 23, 1909 |
| 953,678 | Luther | Mar. 29, 1910 |
| 1,249,430 | Lewis | Dec. 11, 1917 |
| 1,946,239 | Ryan | Feb. 6, 1934 |
| 2,307,499 | Frakes | Jan. 5, 1943 |
| 2,438,350 | Reichard | Mar. 23, 1948 |
| 2,466,211 | Crockett | Apr. 5, 1949 |
| 2,479,186 | Simkins | Aug. 16, 1949 |
| 2,516,657 | Spendlove | July 25, 1950 |
| 2,529,270 | Webster | Nov. 7, 1950 |
| 2,580,682 | Kraft | Jan. 1, 1952 |

FOREIGN PATENTS

| Number | Country | Date |
| --- | --- | --- |
| 553,869 | Great Britain | June 9, 1943 |